United States Patent [19]

Severini et al.

[11] 3,975,458

[45] Aug. 17, 1976

[54] GRAFT POLYMERS OF VINYL CHLORIDE ON UNSATURATED OLEFINIC ELASTOMERS AND PROCESS FOR THE PREPARATION THEREOF

[75] Inventors: Febo Severini; Alberto Valvassori, both of Milan; Alberto Pagliari, Saronno, all of Italy

[73] Assignee: Montecatini Edison S.p.A., Milan, Italy

[22] Filed: Dec. 9, 1974

[21] Appl. No.: 531,080

Related U.S. Application Data

[62] Division of Ser. No. 292,159, Sept. 25, 1972, Pat. No. 3,891,720.

[30] Foreign Application Priority Data

Sept. 23, 1971 Italy .................. 28984/71

[52] U.S. Cl. .................. 260/876 R; 260/878 R
[51] Int. Cl.² .................. C08L 51/00; C08L 27/06
[58] Field of Search .................. 260/876 R, 878 R

[56] References Cited

UNITED STATES PATENTS

| | | | |
|---|---|---|---|
| 3,538,190 | 11/1970 | Meredith et al. | 260/876 R |
| 3,660,529 | 5/1972 | Croch | 260/876 R |
| 3,790,644 | 2/1974 | Obsomer | 260/876 R |
| 3,812,204 | 5/1974 | Natta et al. | 260/878 R |
| 3,891,720 | 6/1975 | Severini et al. | 260/878 R |

Primary Examiner—Alan Holler
Attorney, Agent, or Firm—Hubbell, Cohen, Stiefel & Gross

[57] ABSTRACT

Impact resistant compositions comprising crude graft polymers of vinyl chloride on unsaturated olefinic elastomers, said elastomers being copolymers of ethylene, an α-olefin and a diene or a polyene, are prepared by graft polymerizing vinyl chloride onto an olefinic elastomer. The graft polymerization is discontinued before 70% of the vinyl chloride has been polymerized.

5 Claims, No Drawings

GRAFT POLYMERS OF VINYL CHLORIDE ON UNSATURATED OLEFINIC ELASTOMERS AND PROCESS FOR THE PREPARATION THEREOF

CROSS-REFERENCE TO RELATED APPLICATIONS

This is a division of application Ser. No. 292,159, filed Sept. 25, 1972, now U.S. Pat. No. 3,891,720.

BACKGROUND OF THE INVENTION

1. Field of the Invention

The present invention relates to impact resistant compositions comprising novel crude graft polymers of vinylchloride on unsaturated olefinic elastomers, said elastomers being copolymers of ethylene with an α-olefin and a cyclic or acyclic diene or polyene, and a method for their preparation.

2. Prior Art

Impact resistant materials based on crude products of vinyl chloride grafted onto olefinic elastomers are already known. These materials, although providing manufactured articles of high impact resistance and resistance to aging, have, however, the disadvantage of being difficult to process in the techniques normally used in the transformation of polyvinyl chloride into manufactured articles. Moreover, these materials lead to products having substantial surface unevenness which practically precludes the possibility of using such articles.

The poor processability (workability) of the known high impact materials is evidenced by their low flowability in the molten state (melt index).

For example, the crude graft products which may be prepared by means of the known processes, and containing from 8 to 10% by weight of total olefinic elastomer, never have melt index values higher than 1 (measurement carried out according to ASTM-D 1238 at 185°C, with a load of 23.5 kg).

The methods heretofore used for the preparation of the above mentioned impact resistant materials comprise graft polymerizing vinyl chloride in the presence of an unsaturated olefinic rubber, until almost conversion of the monomer has occurred.

One of these methods is, for example, described in Italian Pat. No. 698,014 in the name of the assignee hereof. The method comprises polymerizing vinyl chloride in the presence of the olefinic rubber dissolved in the monomer, until a particularly high conversion rate has been obtained, and, in any case, greater than 75% conversion.

The crude products which are obtainable by the method described in said Italian patent consist of mixtures comprising the following fractions that are separatable by extraction with solvents:

a. vinyl chloride homopolymers,
b. unmodified olefinic rubber, and
c. a "real" graft copolymer of rubber and vinyl chloride (a copolymer lacking free rubber and vinyl chloride homopolymers).

In these crude products the content of grafted polyvinyl chloride is particularly high, and is generally greater than 45 – 50% by weight with respect to the weight of the graft copolymer.

DESCRIPTION OF THE INVENTION

According to the present invention, it has now been found, quite unexpectedly, that it is possible to prepare impact resistant compositions comprising novel products of vinyl chloride grafted onto unsaturated olefinic elastomers, having excellent workability characteristics in the processes normally used for polyvinyl chloride, and which, at the same time, are capable of being manufactured into articles that, in addition to having high impact resistance characteristics and resistance to aging both under natural and artificial conditions, are free of surface unevenness.

The impact resistant compositions of this invention comprise mixtures of the following components:

a. polyvinyl chloride homopolymer,
b. graft copolymers of vinyl chloride, and
c. unmodified unsaturated olefinic elastomer.

These products are characterized by the fact that the content of polyvinyl chloride present in the graft copolymer (b) is between 15 and 60% by weight and by the fact that the melt index of the compositions (measured according to ASTM D 1238 at 185°C, with a load of 23.5 kg) is always greater than 1 for compositions containing from 5 – 15% of total rubber (unmodified olefinic elastomer + elastomer present in the graft copolymer).

The content of polyvinyl chloride present in the graft copolymer (b) depends on the degree of unsaturation of the olefinic elastomer used for the grafting; and the polyvinyl chloride content increases as the unsaturation increases. The polyvinyl chloride content is between 15% and 45% by weight when the elastomers used for grafting are, e.g., ethylene-propylene-ethylidenenorbornene terpolymers containing 1 – 5% by weight of diene. The polyvinyl chloride content exceeds 4.5% and may be as high as 60% or more when the content of ethylidenenorbornene in the terpolymer amounts to 10% by weight.

The components of the impact resistant products of the invention are in general present in the following proportions by weight:

vinyl chloride homopolymers [component (a)]: 30 – 95%
free rubber [component (c)]: 1–20%
graft copolymers [component (b)]: balance to make up 100%.

The total rubber content (i.e.: free rubber plus modified rubber) present in the compositions according to the invention, in general, is between 2 and 60% by weight.

The percentage of free rubber with respect to the total rubber content depends on the degree of unsaturation of the rubber. In the case of rubbers containing 10% by weight of units derived from the diene or polyene, it is between about 15 and 30%. In the case of rubbers containing 1 – 5% by weight of units derived from the diene or polyene, it is 20 – 40% by weight.

In actual practice, the impact resistant compositions best suited for being transformed into manufactured articles contain from about 5 to 15% by weight of total rubber.

The compositions according to the invention may be obtained directly by grafting vinyl chloride onto the unsaturated elastomer. Alternatively, and this technique may be more desirable because it leads to a greater yield of grafted rubber, the compositions may be prepared by diluting crude graft products having a total rubber content of between 25 and 60% with separately prepared polyvinyl chloride.

The composition of the impact resistant materials according to the invention may be determned by separation of the components. This is done by determining the content of rubber soluble in n-heptane (free rubber) (a) and the residue (b) after extraction with cyclohexanone (free rubber + pure graft copolymer).

By subtracting the amount of (a) from the amount of (b), one obtains the amount of pure graft copolymer, and, knowing the vinyl chloride content of (b), it is possible to obtain the composition of the graft copolymer of vinyl chloride on the olefinic elastomer.

The determinations are carried out in the following way: an exactly weighed quantity of the crude polymer is contacted with an excess of tetrahydrofuran for 12 hours at room temperature to obtain a dispersion which contains small quantities of gel.

This dispersion is poured and uniformly distributed on a fixed quantity of Celite K-535 (a diatomaceous earth produced by Johns-Manville Co.). The tetrahydrofuran is then completely evaporated at room temperature and under reduced pressure. The dry residue is then introduced onto a chromatographic column thermostatically stabilized at 60°C. n-Heptane is percolated through the column until all the free rubber has been extracted therefrom. The heptane extract is then collected in a tared flask and evaporated under reduced pressure, after which it is weighed.

An exactly weighed quantity of the crude polymer is treated for 24 hours at room temperature with an excess of cyclohexanone to dissolve the polyvinyl chloride homopolymer contained therein.

Then the whole mass is filtered on a calibrated Gooch filter and weighed after drying to constant weight. The residue, consisting of free rubber and graft copolymer, is then subjected to chlorine analysis to determine the percentage of vinyl chloride present therein.

The olefinic elastomers used in the preparation of the compositions of the invention are slightly unsaturated copolymers of ethylene with α-olefins and with one or more cyclic or acyclic conjugated or non-conjugated dienes or polyenes.

Preferably, the elastomer consists of substantially amorphous terpolymers of ethylene with propylene or butene-1 and with a third monomer selected from the group consisting of cf: butadiene, a 6-alkylidenenorbornene, norbornadiene-2,5, a 2-alkyl-norbornadiene-2,5, cyclooctabiene-1,5, tetrahydroindene and 5-methyl-tetrahydroindene.

Particularly interesting results have been obtained with ethylene-propylene-6-ethylidenenorbornene, ethylene-propylene-5-methyl-tetrahydroindene and ethylene-propylene-1,4-hexadiene terpolymers as the olefinic elastomer.

The dieneor polyene content of the copolymers is between 2 and 20% by weight. The α-olefin content, in particular propylene, is between about 20% and 60% by weight.

The molecular weight of the copolymers is generally between about 10,000 and 1,000,000.

The crude graft products of the invention are obtained by the graft polymerization of vinyl chloride in the presence of the unsaturated olefinic elastomer.

The preparation method comprises graft-polymerizing vinyl chloride in bulk, emulsion, suspension or solution, and interrupting the reaction when the conversion of the monomer is not higher than 70%.

From a practical view point only, it is preferred that the vinyl chloride conversion be not less than 30%, so that the preferred range of conversion is from 30 to 70%.

Clearly, the reaction time and the percentage of rubber in the crude product will be determined in accordance with the desired composition of the crude product, and more precisely, in accordance with the quantity of rubber present in the starting mixture with the vinyl chloride.

Preferably, the reaction is continued until the conversion reaches a value between 30% and 55% when the vinyl chloride/rubber ratio is between 10:1 and 5:1 by weight, and the rubber has a degree of unsaturation of from 3 to 6 double bonds per 1000 carbon atoms, corresponding to a diene content of 3 to 5% by weight when ethylidenenorbornene is used as the diene.

However, when starting from elastomer/vinyl chloride systems with a high elastomer concentration; for example, between 25% and 50%, it is possible to graft polymerize to a much higher degree of conversion than is possible with systems having a low elastomer concentration.

In practice, the preparation of the grafts according to the preferred method described above may be carried out according to the following procedures.

A stainless steel reactor, fitted with a stirrer and a sleeve for the circulation of a heating liquid is charged with the elastomer which has been cut up into pieces. After removal of the air from the reactor, there is introduced thereto the vinyl chloride monomer. The reaction mass is kept under stirring at a temperature between about 20°C and 60°C, for a period of about 0.5 to 5 hours to dissolve or swell the rubber. To the mass there are then admixed the suspending medium dissolved in water and reaction initiator. The whole mass is then heated to the desired temperature and the reaction is interrupted when the conversion of the monomer has reached the desired value.

After elimination of the unreacted monomer, the crude reaction product is separated from the suspending liquid by centrifuging, washed and finally dried.

It is preferable, when starting from elastomer/monomer systems having a high concentration of elastomer and containing, for instance, from 20 to 50% of elastomer, to carry out the polymerization under the following conditions.

An aqueous solution of the suspending medium and the rubber in granulated form are placed into the reactor. After removing the air from the reactor, the monomer is added thereto and the mass is then kept under stirring at a temperature between about room temperature and 70°C, for about 0.5 to 10 hours, to promote the swelling or dissolution of the elastomer.

To this mass the initiator is then admixed. The reactor is then heated to the desired temperature and the polymerization is permitted to proceed until the desired degree of conversion is achieved. Thereupon the reaction mass is cooled, and after the elimination of the monomer, the polymer is separated from the suspending liquid by centrifuging.

Among the initiators which may be used in the graft reaction there are included peroxidic compounds which are soluble in the monomer, such as alkali metal persulfates, hydrogen peroxide and percarbonates. Also, azo-compounds such as azo-bisisobutyronitrile, the dimethyl ester of $\alpha,\alpha'$-azobutyric acid, the $\alpha,\alpha'$-azodinitrile of $\alpha,\beta$-dimethylvaleric acid, may be used as the initiator.

As suspending agents there may be used organic colloids soluble in water, such as gelatine; cellulosic materials, such as hydroxymethyl cellulose, methyl cellulose, methyl hydroxypropyl cellulose; carbohydrates, such as starch, alginates and synthetic materials, such as polyvinylpyrrolidone, polyvinyl alcohol, partially hydrolyzed polyvinyl acetate, aliphatic esters of polyethyleneglycols, etc.

At the end of the reactions, if it has been carried out in suspension, the crude product is discharged in the form of white pearls, which product, after drying and analysis is stabilized by means of the ingredients conventionally used in the processing of polyvinyl chloride, such as the barium and cadmium stearates and laurates sold by Argus Chemical Co. under the trade name "Mark WSX," and then transformed into manufactured articles.

DESCRIPTION OF THE PREFERRED EMBODIMENTS

The following examples are given for the purpose of further illustrating the present invention without the invention being limited thereto. In these examples the samples used for evaluation were made on pressed plates, using the material obtained by homogenization of the starting powder after the addition of 2% of a Ba-Cd stabilizer; 0.05% of an organic phosphite; 0.1% of an anti-oxidant and 0.5% of a lubricant of the stearic type.

The measurements were made according to the procedures set forth in the following ASTM tests:
Izod resilience (notch impact strength): ASTM D 256;
Rockwell hardness: ASTM D 785; and
Melt index: ASTM D 1238 (at 185°C, under a 23.5 kg. load).

In the Examples, various abbreviations appear. These abbreviations have the following meanings:

| | | |
|---|---|---|
| AIBN | = | azo-bis-isobutyronitrile |
| ENB | = | ethylidenenobornene |
| MTHI | = | methyltetrahydroindene |
| MI | = | melt index |
| VC | = | vinyl chloride |
| CH | = | cyclohexanone |
| PVC | = | polyvinyl chloride |
| TDM | = | t-dodecylmercaptan |
| VCD | = | vinylidene chloride |
| HD | = | hexadiene-1,4. |

EXAMPLE 1

Into a 2 liter stainless steel autoclave, 45 g of an ethylene-propylene-ENB terpolymer, consisting of 58.4% ethylene, 38% propylene and 3.6% ENB; and having a Mooney viscosity ML(1+4') 100°C = 62, were introduced.

After removing the air from the autoclave, 500 g of VC were added thereto. After complete dissolution of the terpolymer in the monomer, 3 g of polyvinyl alcohol dissolved in 770 g of water, and 0.64 gram of AIBN were charged to the autoclave. This mixture was then heated to 65°C and maintained at this temperature for 12 hours. Thereby, there were obtained 512 g of a product containing 8.8% of terpolymer. This product was stabilized with a Ba-Cd stabilizer, was then homogenized in a cylinder mixer. The sheet obtained thereby was compression molded, and the mechanical properties of the product were evaluated. The data are recorded in Table I.

EXAMPLE 2

The procedure used in Example 1 was followed, except that the reaction was interrupted when about 50% of the monomer had been converted. As a result there were obtained 300 grams of a material containing 15% of terpolymer. The material was diluted to a final rubber content of 9% with PVC having a constant K according to Fikentscher of 60 (equal to that of the homopolymer which was formed during the reaction) and was then treated as in Example 1. The results are recorded in Table I.

EXAMPLE 3

Into a 2 liter autoclave 24 g of the terpolymer used in Example 1 and 500 g of vinyl chloride were charged. After the terpolymer had completely dissolved in the monomer, 3 g of polyvinyl alcohol dissolved in 770 g of water and 0.64 g of AIBN were charged into the autoclave.

This mixture was then heated to 65°C and the reaction was interrupted as soon as the conversion of the monomer had reached about 50%. Thereby, there were obtained 264 g of a product containing 9.1% of terpolymer. The product was then processed as in Example 1, and the obtained results are recorded in Table I.

EXAMPLE 4

Into a 2 liter autoclave 80 grams of the terpolymer used in Example 1 and 500 g of vinyl chloride were charged. After the terpolymer had completely dissolved in the monomer, 3 g of polyvinyl alcohol dissolved in 770 g of water and 0.64 g of AIBN were charged into the autoclave.

This mixture was then heated to 65°C and the reaction was interrupted as soon as the conversion of the monomer had reached about 50%.

Thereby, there were obtained 363 g of a product containing 22% of terpolymer. The product was then processed as in Example 2 and the obtained results are recorded in Table I.

EXAMPLE 5

The same procedures as in Example 1 were followed, except that a terpolymer consisting of 51.5% ethylene, 39% propylene and 9.5% ENB and having a Mooney viscosity ML (1+4') 100°C = 72 were used. There were obtained 475 grams of a material containing 9.5% of terpolymer, which was processed as in Example 1. The results are recorded in Table I.

EXAMPLE 6

In a 2 liter autoclave, the procedure of Example 2 was repeated, except that the terpolymer of Example 5 was used. There were obtained 262 g of a material containing 17.2% of terpolymer, which was processed as in Example 2. The results are recorded in Table I.

EXAMPLE 7

A 2 liter autoclave was charged with 45 g of a terpolymer consisting of:
56.6% ethylene, 40% propylene and 3.4% MTHI; and having a Mooney viscosity ML (1+4') 100°C = 96.

Air was removed from the autoclave and 500 g of vinyl chloride were added. After complete dissolution of the terpolymer in the monomer, 3 g of polyvinyl alcohol dissolved in 770 g of deionized and boiled water and 0.64 g of AIBN were charged into the autoclave.

This mixture was then heated to 65°C and the reaction was stopped when the conversion of the monomer had reached about 50%.

There were obtained 296 g of a material containing 15.2% of terpolymer, which was processed as in Example 2. The following results were observed: Izod resilience at 23°C = 71; MI = 3.

EXAMPLE 8

Example 7 was repeated, except that the terpolymer had the following composition: 56.7% ethylene, 40% propylene and 3.3% HD; with a Mooney viscosity ML (1+4') 100°C = 52.

There were obtained 292 g of a material containing 15.4% of terpolymer, which was processed as in Example 2. The following results were observed: Izod resilience at 23°C = 65; MI = 2.

EXAMPLE 9

A 2 liter stainless steel autoclave was charged with 3 g of polyvinyl alcohol dissolved in 740 g of deionized and boiled water and 180 g of a terpolymer consisting of 58.4% ethylene, 38% propylene and 3.6% ENB and having a Mooney viscosity ML (1+4') 100°C = 62.

After removal of the air from the autoclave, 500 g of vinyl chloride monomer were added thereto. This mixture was then stirred for 4 hours at 50°C and thereafter, 0.64 g of AIBN dispersed in 210 g of water was added thereto. The whole mass was then heated at 65°C and maintained at that temperature until the conversion of the VC had reached about 33%. There were obtained 355 g of a product containing 50.7% of terpolymer.

The thus obtained product was diluted to a terpolymer content of 9% with a PVC having a Fikentscher K index equal to that of the homopolymer that had formed in the course of the reaction. The diluted product was then homogenized and compression molded as described in Example 1.

The results of the analysis of the composition of the crude reaction products and the values of the mechanical properties of the material are summarized in Table II.

EXAMPLE 10

Example 9 was repeated, except that the reaction was permitted to proceed until the conversion of the VC had reached about 70%. Thus, there were obtained 486 g of a material containing 37% of terpolymer. This material, diluted to a final rubber content of 9% was homogenized and compression molded as in Example 1, and showed the characteristics recorded in Table II.

EXAMPLE 11

Example 9 was repeated except that the terpolymer consisted of 51.5% ethylene, 39% propylene and 9.5% of ENB and had a Mooney viscosity ML (1+4') 100°C = 72. The reaction was interrupted when the conversion of the VC had reached about 37%. There were obtained 374 g of a material containing 48.1% of terpolymer. The material, diluted to a final rubber content of 9%, homogenized and compression molded as described in Example 1, showed the characteristic reported in Table II.

EXAMPLE 12

Example 11 was repeated, except that the reaction was interrupted when the conversion of the VC reached about 50%. There were obtained 439 g of a material that contained 41% of terpolymer.

The material, diluted to a total rubber content of 9%, homogenized and compression molded as described in Example 1, showed the characteristics reported in Table II.

TABLE I

| Example No. | % Conversion of VC | % Total rubber on crude product | % Free rubber on crude product | % Free rubber on total rubber | % CH residue on crude product | % PVC on crude product (1) | % graft on crude product (2) | % VC in CH residue | % VC in the graft |
|---|---|---|---|---|---|---|---|---|---|
| 1 | 93.2 | 8.8 | 2.4 | 27.3 | 17.0 | 83 | 14.6 | 44.1 | 51.4 |
| 2 | 51.0 | 15.0 | 5.7 | 38.0 | 21.0 | 79 | 15.3 | 25.6 | 35.2 |
| 3 | 48.6 | 9.0 | 3.5 | 38.9 | 13.3 | 86.7 | 9.8 | 32.8 | 44.5 |
| 4 | 56.6 | 22.0 | 8.5 | 38.6 | 28.2 | 71.8 | 19.7 | 27.0 | 38.6 |
| 5 | 85.7 | 9.5 | 3 | 31.4 | 24.6 | 75.4 | 21.6 | 60.0 | 68.3 |
| 6 | 43.4 | 17.2 | 5.9 | 34.4 | 27.3 | 72.7 | 21.4 | 41.8 | 53.4 |

|   | Izod 23°C (kg.cm/cm) | MI (g/10 min.) | Mechanical Properties Rockwell Hardness |
|---|---|---|---|
| 1 | 86* | 0.1 | 64 L |
| 2 | 88* | 4 | 64 L |
| 3 | 72* | 2 | 96 R |
| 4 | 65* | 7 | 98 R |
| 5 | 71* | 0.2 | 60 L |
| 6 | 66* | 20 | 60 L |

*The test pieces partially broke.
(1) Values calculated as completion to 100 of the cyclohexanone residue.
(2) Values calculated as the difference between cyclohexanone residue and free rubber.

TABLE II

| Example No. | % Conversion of VC | % of total rubber on crude product | % of free rubber on total rubber | % of CH residue on crude product | % of PVC on crude product (1) | % of graft on crude product (2) | % VC in CH residue | % VC in the graft | Izod at 23°C (kg.cm/cm) | MI (g/10 min.) |
|---|---|---|---|---|---|---|---|---|---|---|
| 9 | 33.2 | 50.7 | 58.2 | 59.3 | 40.7 | 29.8 | 19.8 | 39.4 |  |  |
| 10 | 68.6 | 37.0 | 30.5 | 49.4 | 50.6 | 38.1 | 35.0 | 45.3 | 72* | 23.5 |
| 11 | 37.0 | 48.1 | 41.2 | 67.5 | 32.5 | 47.7 | 29.3 | 41.8 | 86* | 23.5 |

TABLE II-continued

| Example No. | % Conversion of VC | % of total rubber on crude product | % of free rubber on total rubber | % of CH residue on crude product | % of PVC on crude product (1) | % of graft on crude product (2) | % VC in CH residue | % VC in the graft | Izod at 23°C (kg.cm/cm) | MI (g/10 min.) |
|---|---|---|---|---|---|---|---|---|---|---|
| 12 | 49.6 | 41.0 | 22.1 | 64.3 | 36.7 | 55.2 | 37.2 | 43.4 | 83* | — |

*The test pieces partially broke.
(1) Values calculated as completion to 100 of cyclohexanone residue.
(2) Values calculated as the difference between cyclohexanone residue and free rubber.

Variations and modifications can, of course, be made without departing from the spirit and scope of the invention.

Having thus described our invention, what we desire to secure by Letters Patent and hereby claim is:

1. An impact resistant polymeric composition comprising a mixture of the following components:
   a. a preformed vinyl chloride homopolymer, and
   b. a crude graft product obtained by grafting vinyl chloride onto an elastomeric copolymer of ethylene, an α-olefin and a minor amount of a cyclic or acyclic diene or polyene, said crude graft product comprising (1) vinyl chloride homopolymer, (2) a graft copolymer of vinyl chloride on an elastomeric copolymer, said graft copolymer comprising from 15 to 60% by weight of vinyl chloride, and (3) an unmodified elastomeric copolymer;

said composition having a melt index (determined according to ASTM D 1238 at 185°C. with a load of 23.5 kg.) greater than 1, and containing from 5 to 15% of total rubber, which is defined as the sum of the amounts of elastomeric copolymer contained in components (2) and (3) of the crude graft product.

2. A composition according to claim 1, wherein the olefinic elastomer is a terpolymer of ethylene, propylene and at least one cyclic or acyclic diene or polyene.

3. A composition according to claim 2, wherein the olefinic elastomer is a terpolymer of ethylene, propylene and at least one member selected from the group consisting of butadiene, a 6-alkylidenenorbornene, norbornadiene-2,5, a 2-alkylnorbornadiene-2,5, cyclooctadiene-1,5, tetrahydroindene and 5-methyl-tetrahydroindene.

4. A process for preparing a composition according to claim 1, comprising mixing a preformed vinyl chloride homopolymer with a crude graft product obtained by graft polymerizing vinyl chloride onto an olefinic elastomer, wherein the polymerization is discontinued when the vinyl chloride conversion is not higher than 70%.

5. A process according to claim 4, wherein the polymerization is discontinued when the vinyl chloride conversion is between 30% and 70%.

* * * * *

UNITED STATES PATENT OFFICE
CERTIFICATE OF CORRECTION

Patent No. 3,975,458                Dated August 17, 1976

Inventor(s) Febo Severine et al.

It is certified that error appears in the above-identified patent and that said Letters Patent are hereby corrected as shown below:

Column 1, lines 43-44: "almost conversion" should read -- almost complete conversion --.

Column 2, line 32: "4.5%" should read -- 45% --; line 68: "determned" should read -- determined --.

Column 3, line 45: "of cf:" should read -- of: --; line 47: "cyclooctabiene" should read -- cyclooctadiene --; line 54: "dieneor" should read -- diene or --.

Column 4, line 35: "and reaction" should read -- and the reaction --.

Column 5, line 9: "reactions," should read -- reaction, --; line 41: "ethylidenenobornene" should read -- ethylidenenorbornene --.

Signed and Sealed this

Eighteenth Day of October 1977

[SEAL]

Attest:

RUTH C. MASON
*Attesting Officer*

LUTRELLE F. PARKER
*Acting Commissioner of Patents and Trademarks*